(12) United States Patent
Tohara

(10) Patent No.: US 9,354,046 B2
(45) Date of Patent: May 31, 2016

(54) THREE DIMENSIONAL SHAPE MEASUREMENT APPARATUS, CONTROL METHOD THEREFOR, AND STORAGE MEDIUM

(71) Applicant: CANON KABUSHIKI KAISHA, Tokyo (JP)

(72) Inventor: Masakazu Tohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 13/632,444

(22) Filed: Oct. 1, 2012

(65) Prior Publication Data

US 2013/0093854 A1    Apr. 18, 2013

(30) Foreign Application Priority Data

Oct. 17, 2011    (JP) .................................. 2011-228273

(51) Int. Cl.
*G01B 11/25*    (2006.01)
*G06K 9/00*    (2006.01)

(52) U.S. Cl.
CPC ............ *G01B 11/25* (2013.01); *G01B 11/2545* (2013.01); *G06K 9/00* (2013.01)

(58) Field of Classification Search
CPC .......... H04N 13/02; H04N 2013/0081; H04N 5/23212; H04N 13/0271; H04N 13/0275; G01B 11/24; G01B 11/25
USPC ......... 348/47, 46, E13.074, 13.004, E13.014; 356/3.09, 124, 124.5, 144.5, 603–614; 250/205, 559.23; 382/154
See application file for complete search history.

(56) References Cited

U.S. PATENT DOCUMENTS

| | | | | |
|---|---|---|---|---|
| 5,608,529 A | * | 3/1997 | Hori | 356/609 |
| 7,388,679 B2 | * | 6/2008 | Yoshino et al. | 356/603 |
| 2002/0014577 A1 | * | 2/2002 | Ulrich et al. | 250/205 |
| 2007/0090189 A1 | * | 4/2007 | Suwa et al. | 235/454 |
| 2007/0177160 A1 | * | 8/2007 | Sasaki | 356/603 |
| 2007/0285672 A1 | * | 12/2007 | Mukai et al. | 356/603 |
| 2010/0195114 A1 | * | 8/2010 | Mitsumoto et al. | 356/601 |

FOREIGN PATENT DOCUMENTS

| | | |
|---|---|---|
| JP | H03-128408 A | 5/1991 |
| JP | 11-118443 A | 4/1999 |
| JP | 2007-085862 A | 4/2007 |

* cited by examiner

*Primary Examiner* — Richard Torrente
*Assistant Examiner* — Marnie Matt
(74) *Attorney, Agent, or Firm* — Fitzpatrick, Cella, Harper & Scinto

(57) ABSTRACT

A three dimensional shape measurement apparatus may include a projection unit configured to perform a projection operation to a measurement area; a photographing unit configured to photograph a target object in the measurement area undergoing the projection operation; and a measurement unit configured to measure a three dimensional shape of the target object based on the photographed image. The measurement area includes a measurement reference surface serving as a reference for a focus position of a photographing optical system of the photographing unit, and is defined based on a projection range of the projection unit and a photographing range of the photographing unit. The focus position is set deeper than a position of the measurement reference surface when observed from the photographing unit.

15 Claims, 8 Drawing Sheets

THREE DIMENSIONAL SHAPE MEASUREMENT APPARATUS, CONTROL METHOD THEREFOR, AND STORAGE MEDIUM

BACKGROUND OF THE INVENTION

1. Field of the Invention

The present invention relates to a three dimensional shape measurement apparatus, a control method therefor, and a storage medium.

2. Description of the Related Art

Several three dimensional shape measurement methods used in three dimensional shape measurement apparatuses have been proposed. The passive scheme in which shape measurement is performed using a photographing apparatus alone without a projection apparatus, and the active scheme in which a projection apparatus and a photographing apparatus are used in combination have been known. In the active scheme, the three dimensional shape of a target object is measured from an image obtained by photographing the target object on which a specific projection pattern is projected. Since the target object has a three dimensional shape, the three dimensional shape measurement apparatus needs to satisfy the accuracy required for shape measurement in the depth direction as well.

Japanese Patent Laid-Open Nos. 11-118443 and 2007-85862 disclose examples of such an active three dimensional shape measurement apparatus. Japanese Patent Laid-Open No. 11-118443 discloses a technique of projecting a slit pattern onto a target object upon irradiation, and controlling a light source so that the integrated irradiation intensity distribution has a triangular wave shape, thereby performing three dimensional shape measurement using the principle of the phase shift method. Japanese Patent Laid-Open No. 2007-85862 discloses a technique of defocusing a projection pattern having a digital tone value to form a sine wave pattern, thereby performing three dimensional shape measurement using the principle of the phase shift method, as in Japanese Patent Laid-Open No. 11-118443.

Unfortunately, the three dimensional shape measurement apparatus described in Japanese Patent Laid-Open No. 11-118443 can hardly satisfy the required accuracy across the entire region, in the depth direction, of a target object placed on a measurement reference surface. Similarly, the three dimensional shape measurement apparatus described in Japanese Patent Laid-Open No. 2007-85862 can hardly satisfy the required accuracy across the entire region of the target object in the depth direction. This is because the contrast of an image obtained by photographing the target object lowers as the defocus from the focal plane of a photographing optical system becomes considerable, leading to degradation in accuracy of a three dimensional shape calculated from the image with poorer contrast.

More specifically, as in Japanese Patent Laid-Open No. 11-118443, when the focal plane of a photographing optical system is defined as a measurement reference surface, the contrast of an image obtained by photographing a target object placed on the measurement reference surface lowers in a direction away from the measurement reference surface, resulting in degradation in measurement accuracy. Therefore, the measurement accuracy of the target object on the measurement reference surface is considerably poor on the face of the target object closest to the photographing apparatus, thus making it difficult to satisfy the required accuracy across the entire region in the depth direction.

Also, as in Japanese Patent Laid-Open No. 2007-85862, when the focal plane of a projection pattern falls outside a region where a target object is present, the contrast of the projection pattern lowers on the surface of the target object from the face of the target object closer to the focal plane of the projection pattern to the face of the target object farther from the focal plane of the projection pattern. Accordingly, the contrast of the photographed image lowers, and the measurement accuracy degrades, thus making it difficult to satisfy the required accuracy across the entire region in the depth direction, as in Japanese Patent Laid-Open No. 11-118443.

SUMMARY OF THE INVENTION

The present invention has been made in consideration of the above-mentioned problem, and provides a technique of suppressing degradation in measurement accuracy in the depth direction to obtain good measurement accuracy across the entire measurement area.

According to one aspect of the present invention, there is provided a three dimensional shape measurement apparatus comprising: a projection unit configured to perform a projection operation to a measurement area; a photographing unit configured to photograph a target object in the measurement area undergoing the projection operation; and a measurement unit configured to measure a three dimensional shape of the target object based on the photographed image, wherein the measurement area includes a measurement reference surface serving as a reference for a focus position of a photographing optical system of the photographing unit, and is defined based on a projection range of the projection unit and a photographing range of the photographing unit, and the focus position is set deeper than a position of the measurement reference surface when observed from the photographing unit.

According to one aspect of the present invention, there is provided a control method for a three dimensional shape measurement apparatus including a projection unit, a photographing unit, and a measurement unit, the method comprising: a projection step of causing the projection unit to perform a projection operation to a measurement area; a photographing step of causing the photographing unit to photograph a target object in the measurement area undergoing the projection operation; and a measurement step of causing the measurement unit to measure a three dimensional shape of the target object based on the photographed image, wherein the measurement area includes a measurement reference surface serving as a reference for a focus position of a photographing optical system of the photographing unit, and is defined based on a projection range of the projection unit and a photographing range of the photographing unit, and the focus position is set deeper than a position of the measurement reference surface when observed from the photographing unit.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
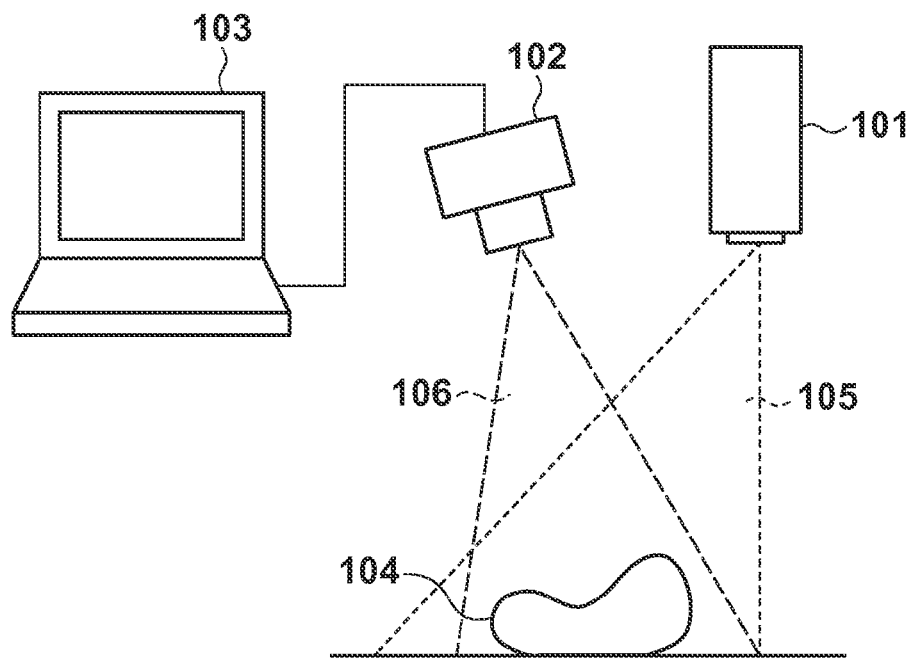
FIG. 1 is a view showing the configuration of a three dimensional shape measurement apparatus according to the first embodiment.

The configuration of a three dimensional shape measurement apparatus according to the first embodiment will be described with reference to FIG. 1. The three dimensional shape measurement apparatus includes a projection unit 101, photographing unit 102, and control unit 103.

The projection unit 101 is a projector which performs a projection operation of projecting pattern light onto a target object 104. The projection unit 101 is capable of projection to an area indicated by a projection range 105. The projection unit 101 has a projection axis and projection image center which do not match each other, like a projector used for upward projection in, for example, a conference room. Note that the projection axis means an optical axis extending toward the projection center.

The photographing unit 102 is a camera which photographs the target object 104 onto which pattern light is projected. The photographing unit 102 can photograph an area indicated by a photographing range 106. The control unit 103 is, for example, a personal computer and controls the operations of the projection unit 101 and photographing unit 102. The control unit 103 also performs a process of measuring the three dimensional shape of the target object 104.

Figure 2:
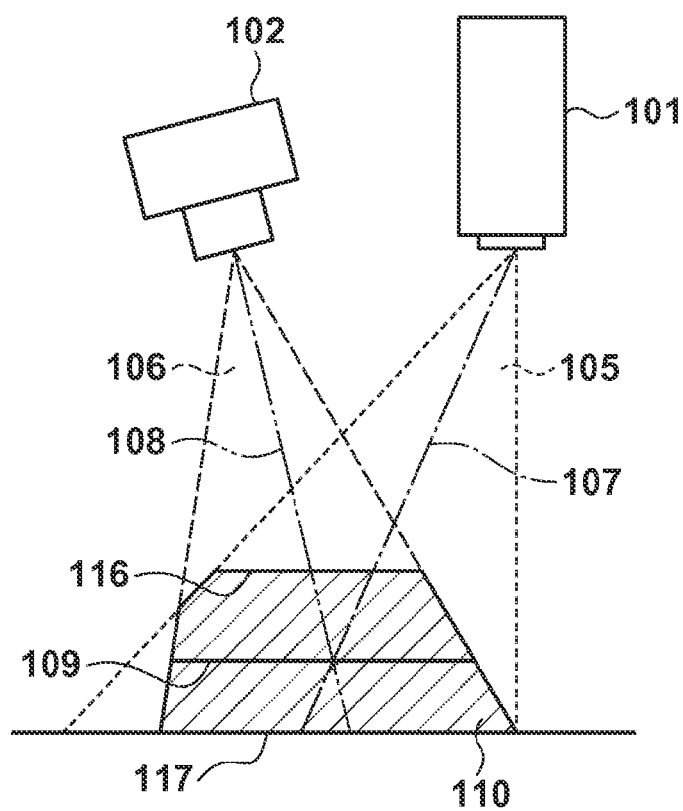
FIG. 2 is a view showing a measurement reference surface and a measurement area according to the first embodiment.

A measurement reference surface and a measurement area according to the first embodiment will be described next with reference to FIG. 2. An optical axis 107 extends from the projection unit 101 toward the projection image center, and does not match the projection axis. An optical axis 108 is the optical axis of the photographing unit 102 (a photographing axis extending toward the photographing center). A measurement reference surface 109 includes the point at which the optical axes 107 and 108 intersect with each other. A measurement area 110 is included in and defined by both the projection range 105 and the photographing range 106. In this embodiment, the measurement reference surface 109 is included in the measurement area 110, and located so as to bisect the depth of the measurement area 110 when observed from the photographing unit 102. A measurement surface 116 is closest to the projection unit 101 and photographing unit 102 in the measurement area 110. A measurement surface 117 is farthest from the projection unit 101 and photographing unit 102 in the measurement area 110. Although the measurement reference surface 109 is set within the measurement area 110 in this embodiment, its position is not limited to the interior of the measurement area 110, and may be the exterior of the measurement area 110.

Figure 3:
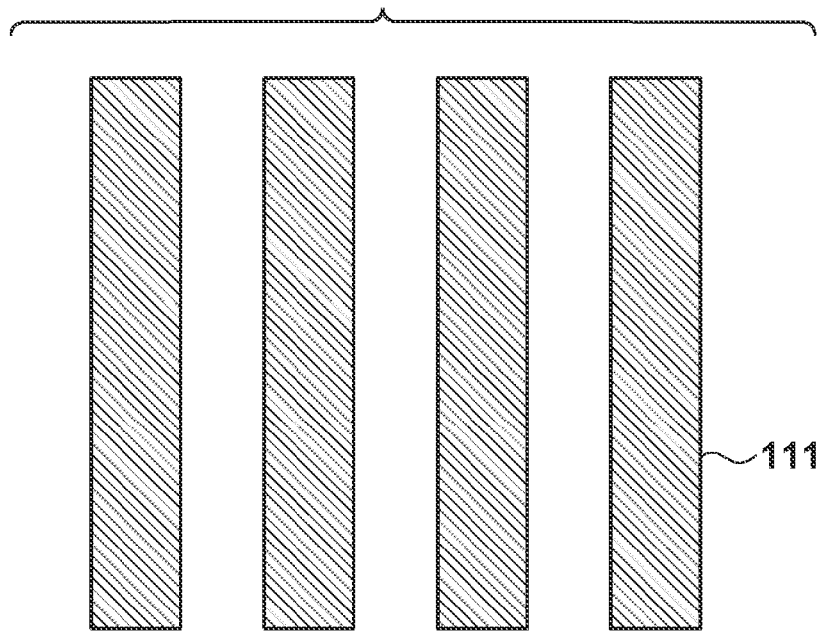
FIG. 3 is a view showing a projection pattern according to the first embodiment.

The three dimensional shape measurement apparatus according to this embodiment performs shape measurement using the space encoding method. First, the projection unit 101 projects a bright/dark pattern 111, as shown in FIG. 3, onto the target object 104. The photographing unit 102 photographs the target object 104 onto which the bright/dark pattern 111 is projected. The control unit 103 processes the image photographed by the photographing unit 102 to measure the three dimensional shape of the target object 104. More specifically, the control unit 103 detects the bright/dark edge position of the bright/dark pattern 111 to calculate the distances from the projection unit 101 and photographing unit 102 to the target object 104 in accordance with the principle of triangulation, based on the angle that the projection axis of the projection unit 101 makes with the photographing axis of the photographing unit 102 corresponding to the detected edge position.

In this embodiment, the zero-crossing detection method is used as a method of detecting the edge position of the bright/dark pattern 111. The zero-crossing detection method continuously projects patterns upon switching between the bright/dark positions of the bright/dark pattern 111 to determine, as an edge position, the intersection of the intensity distributions of the images photographed by the photographing unit 102.

In the zero-crossing detection method, the detection accuracy of an edge position is generally known to improve as the contrast of a bright/dark pattern photographed by the photographing unit 102 increases. Also, the S/N ratio (signal-to-noise ratio) of the photographing unit 102 improves as the brightness of an image photographed by the photographing unit 102 increases. Hence, the detection accuracy of an edge position improves as the brightness of an image projected by the projection unit 101 increases.

Figure 13A:
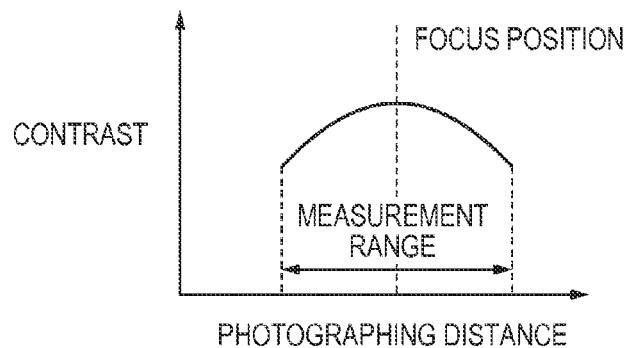
FIGS. 13A to 13C are graphs each showing the relationship between the photographing distance and the contrast, or that between the photographing distance and the brightness of a photographed image according to the first embodiment.
Figure 13B:
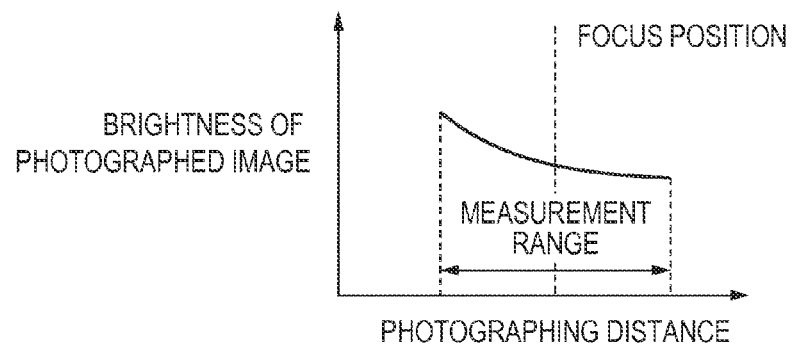

The three dimensional shape measurement apparatus according to this embodiment must perform shape measurement with an accuracy equal to or higher than the required accuracy across the entire measurement area 110. However, the contrast of an image photographed by the photographing unit 102 is high at a focus position, but lowers as the position in the image deviates more from the focus position, as shown in FIG. 13A. Also, a brighter image is obtained as the angle of view increases with a decrease in distance from the photographing unit 102, but a darker image is obtained as the angle of view decreases with an increase in distance from the photographing unit 102, as shown in FIG. 13B.

Figure 14A:
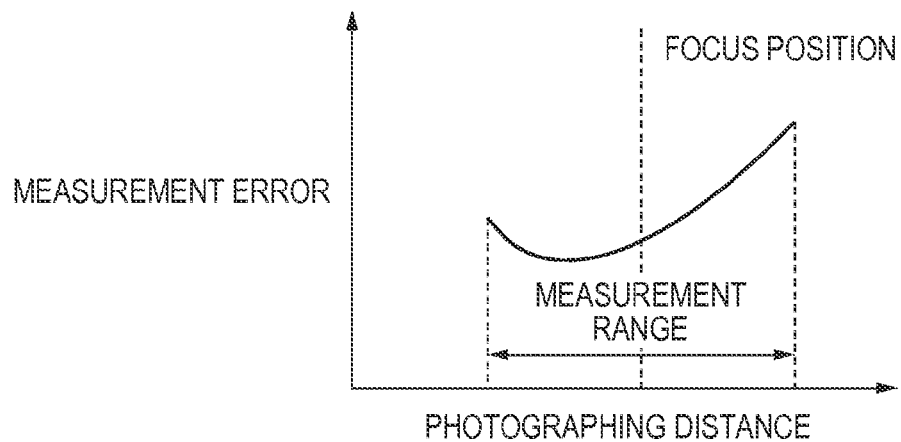
FIGS. 14A and 14B are graphs each showing the relationship between the photographing distance and the measurement error according to the first embodiment.

For this reason, when the focus position of the photographing unit 102 is set on the measurement reference surface 109, the contrast lowers on the measurement surface 116 due to defocus, but a photographed image is bright because the measurement surface 116 is close to the photographing unit 102. On the other hand, the contrast lowers on the measurement surface 117 due to defocus, and a photographed image is dark because the measurement surface 117 is far from the photographing unit 102. Therefore, the relationship between the photographing distance and the measurement error is as shown in FIG. 14A, so the measurement accuracy is lower on the measurement surface 117 than on the measurement surface 116.

To combat this problem, in this embodiment, the focus position of the projection unit 101 is set on the measurement reference surface 109, and the focus position of the photographing unit 102 is set on a position deeper from the photographing unit 102 than the measurement reference surface 109.

Figure 4:
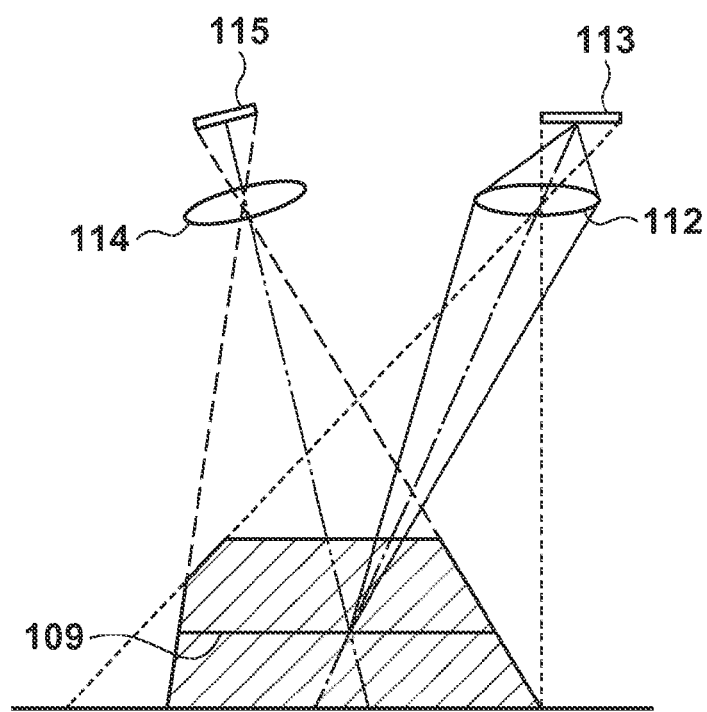
FIG. 4 is a schematic view of an optical system according to the first embodiment.

FIG. 4 shows the focus position of the projection unit 101. A lens 112 serves as the projection optical system of the projection unit 101, which is schematically represented as one lens. A display element 113 displays a bright/dark pattern. The focus position of the projection unit 101 is set on the measurement reference surface 109, as shown in FIG. 4.

Figure 5:
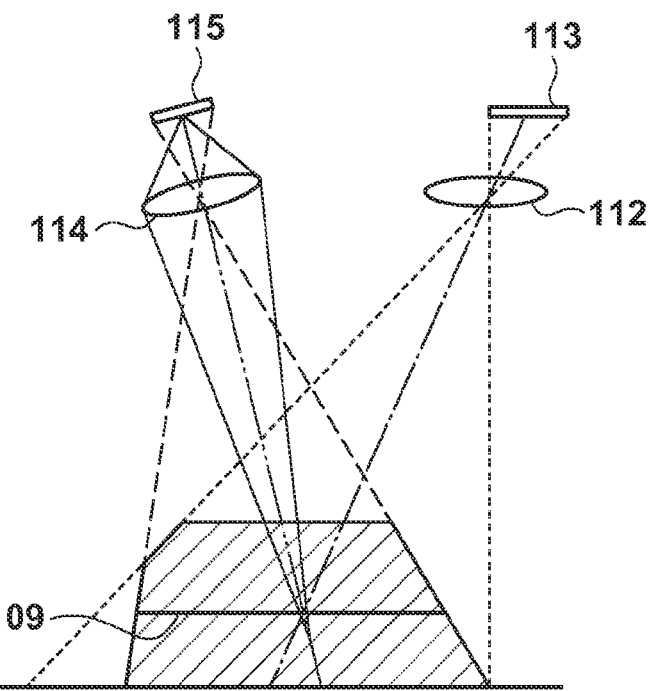
FIG. 5 is a schematic view of another optical system according to the first embodiment.

On the other hand, FIG. 5 shows the focus position of the photographing unit 102. A lens 114 serves as a photographing optical system of the photographing unit 102, which is schematically represented as one lens. An image sensing element 115 converts light incident from the lens 114 into an electrical signal. The focus position of the photographing unit 102 is set on a position deeper than the measurement reference surface 109, as shown in FIG. 5.

Figure 13C:
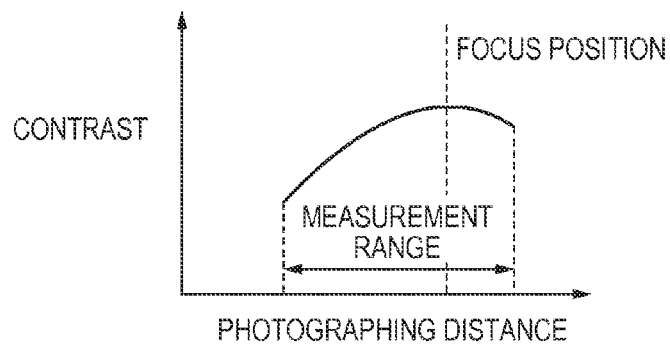
Figure 14B:
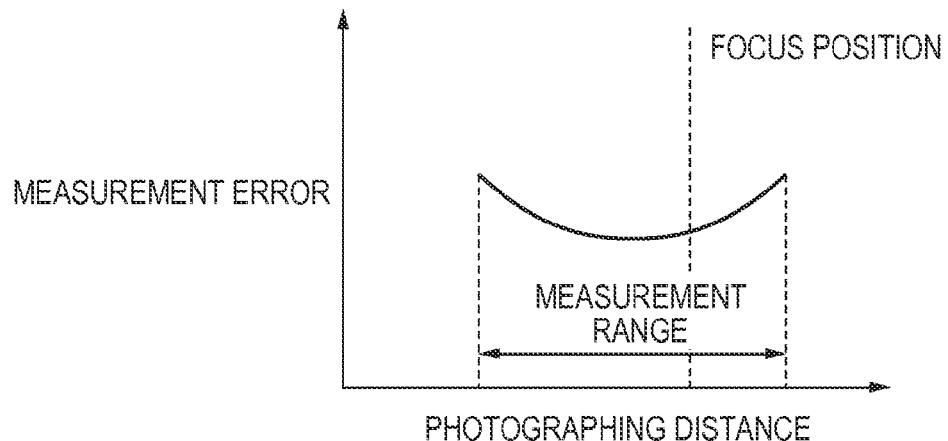

With a configuration as shown in FIGS. 4 and 5, the contrast lowers more considerably on the measurement surface 116 than on the measurement surface 117 due to defocus of the photographing unit 102, as shown in FIG. 13C. Therefore, the relationship between the photographing distance and the measurement error is as shown in FIG. 14B, so the measurement surfaces 116 and 117 exhibit nearly the same measurement accuracy due not only to the defocus but also to a change in brightness of a photographed image, which depends on the distance from the photographing unit 102. Also, because the focus position of the photographing unit 102 is deeper than the measurement reference surface 109, the contrast lowers on the measurement surface 117 less than the case wherein the focus position of the photographing unit 102 is set on the measurement reference surface 109. This means that the measurement accuracy on the measurement surface 117 is better than the case wherein the focus position is set on the measurement reference surface 109. That is, the measurement error falls within a predetermined range across the overall photographing distance, thus making it possible to obtain a predetermined measurement accuracy as a whole without too much degradation.

As described above, a predetermined accuracy can be obtained across the entire measurement area 110 by setting the focus position of the photographing unit 102 deeper than the measurement reference surface 109. When the focus position of the photographing unit 102 is set on the measurement reference surface 109, it is necessary to increase the contrast of a photographed image by improving the imaging performance of the photographing unit 102 or increase the amount of light projected by the projection unit 101, in order to obtain nearly the same measurement accuracy as in this embodiment across the entire measurement area 110. However, this embodiment obviates the need for this operation and, in turn, obviates the need to improve the imaging performance of the photographing unit 102 more than required. This makes it possible to reduce the number of lenses which constitute the photographing unit 102, leading to overall cost savings. Also, keeping the power of a light source of the projection unit 101 low makes it possible to reduce the power consumption and the amount of heat generated by the light source, thus downsizing a cooling system and eventually the entire apparatus.

Note that as the measurement area has a larger depth, and the distance between the measurement surfaces 116 and 117 increases, the difference between the brightness of the photographed image of the measurement surface 116 and that of the photographed image of the measurement surface 117 increases, so the focus position of the photographing unit 102 is set at a position closer to the measurement surface 117. This makes it possible to suppress a decrease in contrast on the measurement surface 117 due to defocus, thus reducing degradation in accuracy on the measurement surface 117.

Also, when the contrast considerably lowers due to defocus of the lens 114 of the photographing unit 102, the focus position of the photographing unit 102 is set at a position close to the measurement reference surface 109. This makes it possible to suppress a decrease in contrast on the measurement surface 116 due to defocus, thus reducing degradation in accuracy on the measurement surface 116.

Note that as a method of setting the focus position of the photographing unit 102 on a position deeper than the measurement reference surface 109, it may be done upon design of the photographing optical system of the photographing unit 102. Also, when the photographing unit 102 has an autofocus function, it may adopt a method of placing a focusing chart at a position on which the focus is to be adjusted, or a method of adjusting the focus on the measurement reference surface 109 and then adjusting the focus on a deep position using a focus adjusting lens. Moreover, if the focus position is too deep, the measurement accuracy locally becomes low, so the focus position is desirably set at an appropriate position in accordance with the relationship between the contrast and the image brightness.

In this embodiment, three dimensional shape measurement is performed using the space encoding method, and the zero-crossing detection method is used as a method of detecting an edge position. However, the present invention is not limited to the zero crossing detection method, and a method of detecting an edge position using a differential filter or detecting the barycenter of the intensity distribution may be used. Also, as a three dimensional shape measurement method, not only the space encoding method but also the light-section method or the phase shift method which projects a sine wave pattern may be used.

Second Embodiment

Figure 6:
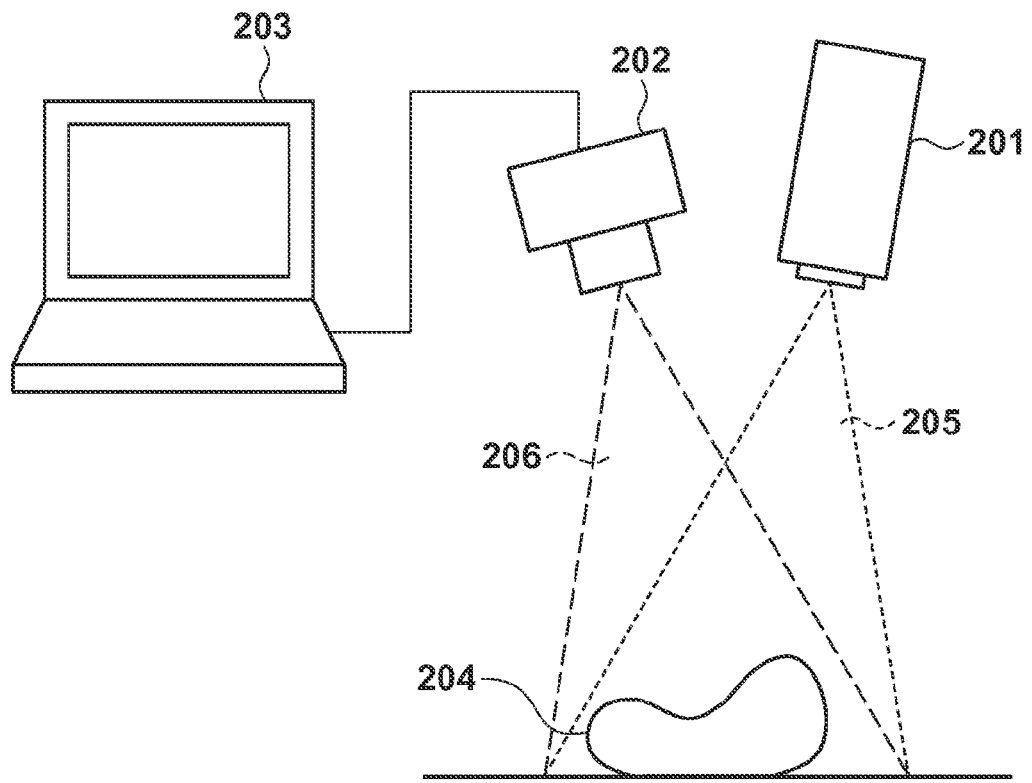
FIG. 6 is a view showing the configuration of a three dimensional shape measurement apparatus according to the second embodiment.

The configuration of a three dimensional shape measurement apparatus according to the second embodiment will be described with reference to FIG. 6. The three dimensional shape measurement apparatus includes a projection unit 201, photographing unit 202, and control unit 203.

The projection unit 201 is a projector which performs a projection operation of projecting pattern light onto a target object 204. The projection unit 201 is capable of projection to an area indicated by a projection range 205. The projection unit 201 has a projection axis and projection image center which match each other, unlike the first embodiment.

The photographing unit 202 is a camera which photographs the target object 204 onto which pattern light is projected. The photographing unit 202 can photograph an area indicated by a photographing range 206. The control unit 203 is, for example, a personal computer and controls the operations of the projection unit 201 and photographing unit 202. The control unit 203 also performs a process of measuring the three dimensional shape of the target object 204.

Figure 7:
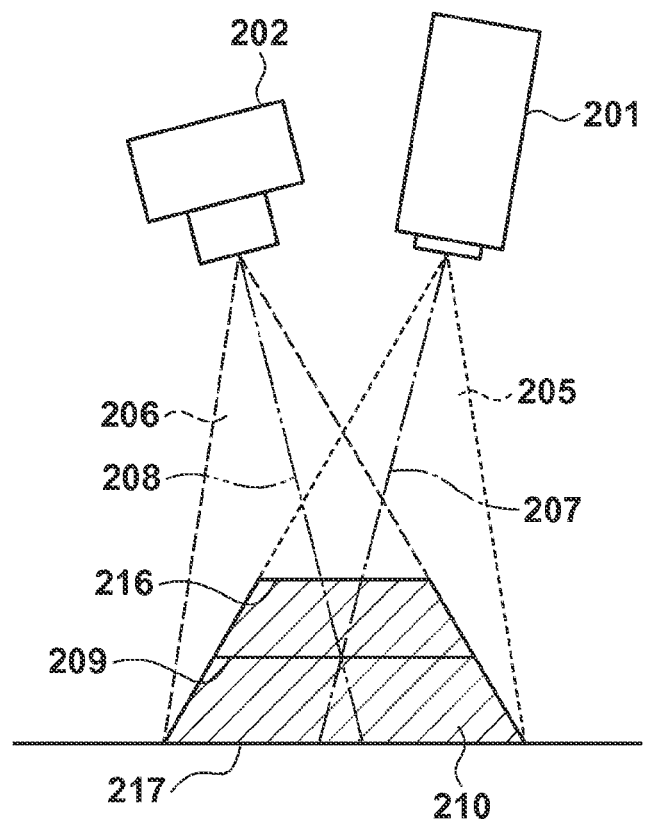
FIG. 7 is a view showing a measurement reference surface and a measurement area according to the second embodiment.

A measurement reference surface and a measurement area according to the second embodiment will be described next with reference to FIG. 7. An optical axis 207 extends from the projection unit 201 toward the projection image center, and matches the projection axis. An optical axis 208 is the optical axis of the photographing unit 202 (a photographing axis extending toward the photographing center). A measurement reference surface 209 includes the point at which the optical axes 207 and 208 intersect with each other. A measurement area 210 is included in and defined by both the projection range 205 and the photographing range 206. In this embodiment, the measurement reference surface 209 is included in the measurement area 210, and located so as to bisect the depth of the measurement area 210 when observed from the photographing unit 202. A measurement surface 216 is closest to the projection unit 201 and photographing unit 202 in the measurement area 210. A measurement surface 217 is farthest from the projection unit 201 and photographing unit 202 in the measurement area 210. Although the measurement reference surface 209 is set within the measurement area 110 in this embodiment, its position is not limited to the interior of the measurement area 210, and may be the exterior of the measurement area 210.

As in the first embodiment, the three dimensional shape measurement apparatus according to this embodiment performs shape measurement using the space encoding method, and uses the zero-crossing detection method as a method of detecting an edge position.

In this embodiment as well, the focus position of the projection unit 201 is set on the measurement reference surface 209, and the focus position of the photographing unit 202 is set on a position deeper from the photographing unit 202 than the measurement reference surface 209.

Figure 8:
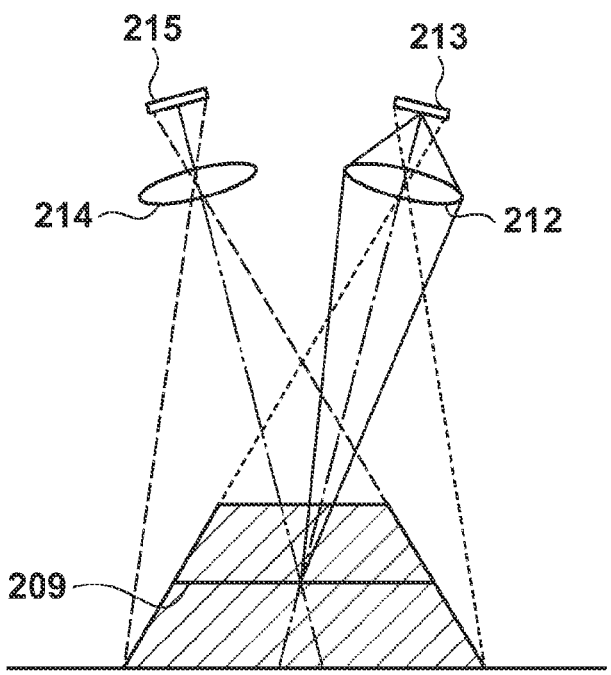
FIG. 8 is a schematic view of an optical system according to the second embodiment.

FIG. 8 shows the focus position of the projection unit 201. A lens 212 serves as the projection optical system of the projection unit 201, which is schematically represented as one lens. A display element 213 displays a bright/dark pattern. The focus position of the projection unit 201 is set on the measurement reference surface 209, as shown in FIG. 8.

Figure 9:
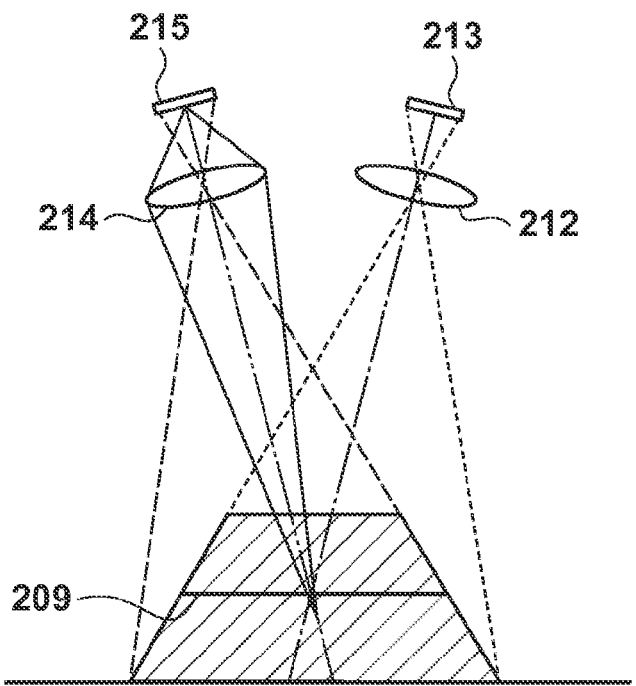
FIG. 9 is a schematic view of another optical system according to the second embodiment.

On the other hand, FIG. 9 shows the focus position of the photographing unit 202. A lens 214 serves as a photographing optical system of the photographing unit 202, which is schematically represented as one lens. An image sensing element 215 converts light incident from the lens 214 into an electrical signal. The focus position of the photographing unit 202 is set on a position deeper than the measurement reference surface 209, as shown in FIG. 9.

With a configuration as shown in FIGS. 8 and 9, the contrast lowers more considerably on the measurement surface 216 than on the measurement surface 217 due to defocus of the photographing unit 202. Therefore, the measurement surfaces 216 and 217 exhibit nearly the same measurement accuracy due not only to the defocus but also to a change in brightness of a photographed image, which depends on the distance from the photographing unit 202. Also, because the focus position of the photographing unit 202 is deeper than the measurement reference surface 209, the contrast lowers on the measurement surface 217 less than the case wherein the focus position of the photographing unit 202 is set on the measurement reference surface 209. This means that the measurement accuracy on the measurement surface 217 is better than the case wherein the focus position is set on the measurement reference surface 209. That is, the measurement error falls within a predetermined range across the overall photographing distance, thus making it possible to obtain a predetermined measurement accuracy as a whole without too much degradation.

As described above, a predetermined accuracy can be obtained across the entire measurement area 210 by setting the focus position of the photographing unit 202 deeper than the measurement reference surface 209. When the focus position of the photographing unit 202 is set on the measurement reference surface 209, it is necessary to increase the contrast of a photographed image by improving the imaging performance of the photographing unit 202 or increase the amount of light projected by the projection unit 201, in order to obtain nearly the same measurement accuracy as in this embodiment across the entire measurement area 210. However, this embodiment obviates the need for this operation and, in turn, obviates the need to improve the imaging performance of the photographing unit 202 more than required. This makes it possible to reduce the number of lenses which constitute the photographing unit 202, leading to overall cost savings. Also, keeping the power of a light source of the projection unit 201 low makes it possible to reduce the power consumption and the amount of heat generated by the light source, thus downsizing a cooling system and eventually the entire apparatus.

Third Embodiment

Figure 10:
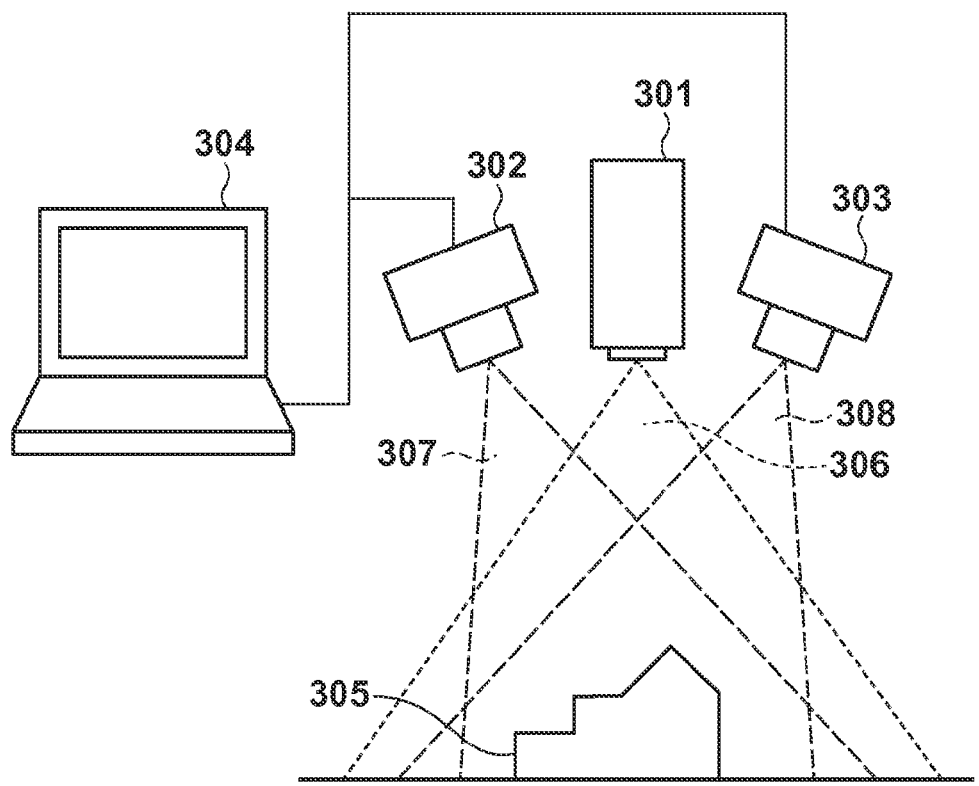
FIG. 10 is a view showing the configuration of a three dimensional shape measurement apparatus according to the third embodiment.

The configuration of a three dimensional shape measurement apparatus according to the third embodiment will be described with reference to FIG. 10. The three dimensional shape measurement apparatus includes a projection unit 301, photographing unit 302, photographing unit (second photographing unit) 303, and control unit 304.

In this embodiment, the projection unit 301 uses the active stereo scheme, and therefore performs a projection operation of projecting a solid image onto a target object 305 or irradiating the target object 305 using a light source. The projection unit 301 is capable of projection to an area indicated by a projection range 306.

Each of the photographing units 302 and 303 is a camera which photographs the target object 305 on which a specific projection pattern is projected by the projection unit 301. The photographing unit 302 can photograph an area indicated by a photographing range 307. The photographing unit 303 can photograph an area indicated by a photographing range 308. That is, the photographing units 302 and 303 photograph in different directions. The control unit 304 is, for example, a personal computer and controls the operations of the projection unit 301 and photographing units 302 and 303. The control unit 304 also performs a process of measuring the three dimensional shape of the target object 305.

Figure 11:
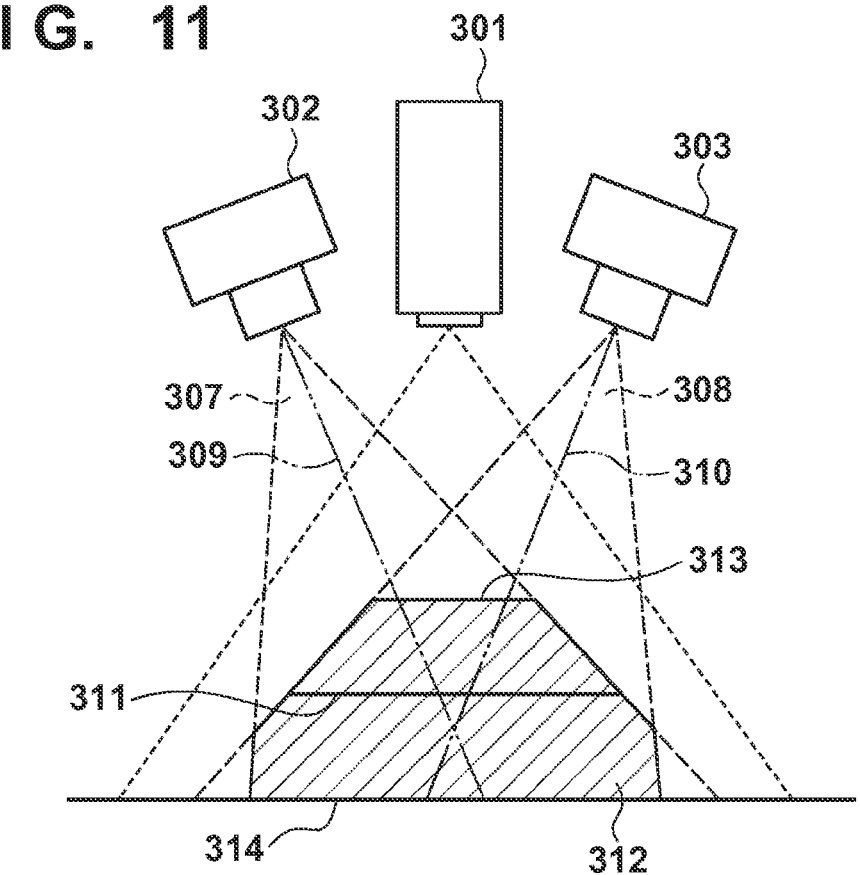
FIG. 11 is a view showing a measurement reference surface and a measurement area according to the third embodiment.

A measurement reference surface and a measurement area according to the third embodiment will be described next with reference to FIG. 11. An optical axis 309 is the optical axis of the photographing unit 302 (a photographing axis extending toward the photographing center). An optical axis 310 is the optical axis of the photographing unit 303 (a photographing axis extending toward the photographing center). A measurement reference surface 311 includes the point at which the projection axis of the projection unit 301 intersects with each of the optical axes 309 and 310. A measurement area 312 is included in and defined by the projection range 306 and the photographing ranges 307 and 308. In this embodiment, the measurement reference surface 311 is included in the measurement area 312, and located so as to bisect the depth of the measurement area 312 when observed from the photographing unit 302. A measurement surface 313 is closest to the projection unit 301 and photographing units 302 and 303 in the measurement area 312. A measurement surface 314 is farthest from the projection unit 301 and photographing units 302 and 303 in the measurement area 312. Although the measurement reference surface 311 is set within the measurement area 312 in this embodiment, its position is not limited to the interior of the measurement area 312, and may be the exterior of the measurement area 312.

Unlike the first and second embodiments, the three dimensional shape measurement apparatus according to this embodiment adopts the active stereo scheme (stereo method) in which the distance to the target object 305 is calculated using the principle of triangulation from an image obtained when each of the photographing units 302 and 303 photographs the target object 305 on which a specific projection pattern is projected by the projection unit 301. This obviates the need for the projection unit 301 to project a pattern, so the projection unit 301 need only project a solid image. Further, the projection unit 301 may be an illumination unit such as a light bulb.

In the active stereo scheme, a feature amount such as the edge of the target object 305 is detected from a photographed image and associated with an image photographed by each of the photographing units 302 and 303, thereby performing triangulation. Hence, the higher the contrast of the edge of the target object 305 photographed by each of the photographing units 302 and 303, the higher the detection accuracy of an edge position. Also, the higher the brightness of an image photographed by each of the photographing units 302 and 303, the better the S/N ratio of each of the photographing units 302 and 303. This means that the higher the brightness of light projected by the projection unit 301, the higher the detection accuracy of an edge position.

Hence, in this embodiment, as in the first and second embodiments, the focus positions of the photographing units 302 and 303 are set on positions deeper than the measurement reference surface 311.

Figure 12:
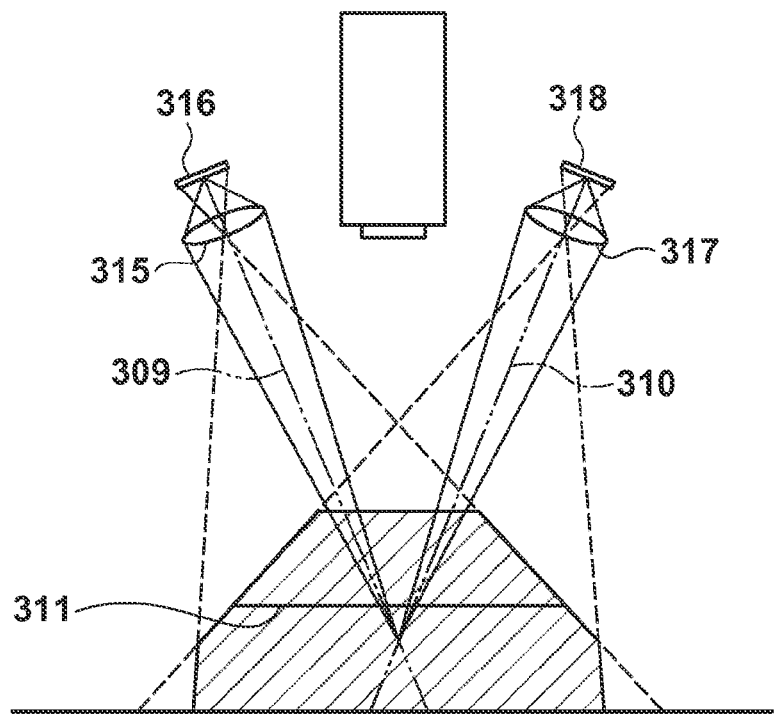
FIG. 12 is a schematic view of an optical system according to the third embodiment.

FIG. 12 shows the focus positions of the photographing units 302 and 303. A lens 315 serves as the photographing optical system of the photographing unit 302, which is schematically represented as one lens. A lens 317 serves as the photographing optical system of the photographing unit 303, which is schematically represented as one lens. Image sensing elements 316 and 318 convert light incident from the lenses 315 and 317, respectively, into electrical signals.

With a configuration as shown in FIG. 12, the contrast lowers more considerably on the measurement surface 313 than on the measurement surface 314 due to defocus of the photographing units 302 and 303. Therefore, the measurement surfaces 313 and 314 exhibit nearly the same measurement accuracy due not only to the defocus but also to a change in brightness of a photographed image, which depends on the distance from each of the photographing units 302 and 303. Also, because the focus positions of the photographing units 302 and 303 are deeper than the measurement reference surface 311, the contrast lowers on the measurement surface 314 less than the case wherein the focus positions of the photographing units 302 and 303 are set on the measurement reference surface 311. This means that the measurement accuracy on the measurement surface 314 is better than the case wherein the focus positions are set on the measurement reference surface 311. That is, the measurement error falls within a predetermined range across the overall photographing distance, thus making it possible to obtain a predetermined measurement accuracy as a whole without too much degradation.

As described above, a predetermined accuracy can be obtained across the entire measurement area 312 by setting the focus positions of the photographing units 302 and 303 deeper than the measurement reference surface 311. When the focus positions of the photographing unit 302 and 303 are set on the measurement reference surface 311, it is necessary to increase the contrasts of photographed images by improving the imaging performance of the photographing units 302 and 303 or increase the amount of light projected by the projection unit 301, in order to obtain nearly the same measurement accuracy as in this embodiment across the entire measurement area 312. However, this embodiment obviates the need for this operation and, in turn, obviates the need to improve the imaging performance of the photographing units 302 and 303 more than required. This makes it possible to reduce the numbers of lenses which constitute the photographing units 302 and 303, leading to overall cost savings. Also, keeping the power of a light source of the projection unit 301 low makes it possible to reduce the power consumption and the amount of heat generated by the light source, thus downsizing a cooling system and eventually the entire apparatus.

According to the present invention, it is possible to suppress degradation in measurement accuracy in the depth direction to obtain good measurement accuracy across the entire measurement area.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-228273 filed on Oct. 17, 2011, which is hereby incorporated by reference herein in its entirety.

What is claimed is:

1. A three dimensional shape measurement apparatus comprising:
   a projection unit configured to project a stripe pattern including a light portion and a bright portion to a measurement area;
   a photographing unit configured to photograph a target object in the measurement area while the stripe pattern is projected by the projection unit, wherein the photographing unit has single image sensing element and single focus position;
   a detection unit configured to detect an edge position representing a boundary between a light portion and a dark portion based on an image photographed by the photographing unit; and
   a measurement unit configured to measure a three dimensional shape of the target object based on the edge position detected by the detection unit,
   wherein a focus position of the photographing unit is set deeper than an intersection between an axis going through a center of a projection range of the projection unit and an axis going through a center of a photographing range of the photographing unit, when observed from the photographing unit, wherein a focus position of the projection unit is set not shallower than the intersection between the axis going through the center of the projection range of the projection unit and the axis going through the center of the photographing range of the photographing unit, when observed from the projection unit, and wherein a contrast value between the light portion and the dark portion in the image photographed by the photographing unit has a maximum value in an area deeper than the intersection, when observed from the photographing unit.

2. The apparatus according to claim 1, further comprising:
a second photographing unit configured to photograph the target object in the measurement area, while the stripe pattern is projected by the projection unit, from a direction different from a direction in which said photographing unit photographs, wherein said measurement unit measures the shape of the target object using a stereo method, based on the image photographed by said photographing unit, and the image photographed by said second photographing unit.

3. The apparatus according to claim 1, wherein the measurement unit measures the shape of the target object by a space encoding method.

4. The apparatus according to claim 1, wherein the measurement unit measures the shape of the target object by a phase shift method.

5. The apparatus according to claim 1, wherein the focus position of the photographing unit is fixed.

6. A control method for a three dimensional shape measurement apparatus including a projection unit, a photographing unit, and a measurement unit, the method comprising:
a projection step of causing the projection unit to project a stripe pattern including a light portion and a bright portion to a measurement area;
a photographing step of causing the photographing unit to photograph a target object in the measurement area while the stripe pattern is projected in the projection step, wherein the photographing unit has single image sensing element and single focus position;
a detection step of detecting an edge position, representing a boundary between a light portion and a dark portion based on an image photographed in the photographing step by the photographing unit; and
a measurement step of causing the measurement unit to measure a three dimensional shape of the target object based on the edge position detected by the detection step,
wherein a focus position of the photographing unit is set deeper than an intersection between an axis going through a center of a projection range of the projection unit and an axis going through a center of a photographing range of the photographing unit, when observed from the photographing unit,
wherein a focus position of the photographing unit is set not shallower than the intersection between the axis going through the center of the projection range of the projection unit and the axis going through the center of the photographing range of the photographing unit, when observed from the projection unit, and
wherein a contrast value between the light portion and the dark portion in the image photographed by the photographing unit has a maximum value in an area deeper than the intersection, when observed from the photographing unit.

7. A non-transitory computer-readable storage medium storing a computer program for causing a computer to execute each step in a control method for a three dimensional shape measurement apparatus, the method comprising:
a projection step of causing a projection unit to project a stripe pattern including a light portion and a bright portion to a measurement area;
a photographing step of causing a photographing unit to photograph a target object in the measurement area while the stripe pattern is projected in the projection step, wherein the photographing unit has single image sensing element and single focus position;
a detection step of detecting an edge position, representing a boundary between a light portion and a dark portion based on an image photographed in the photographing step by the photographing unit; and
a measurement step of causing the measurement unit to measure a three dimensional shape of the target object based on the edge position detected by the detection step,
wherein a focus position of the photographing unit is set deeper than an intersection between an axis going through a center of a projection range of the projection unit and an axis going through a center of a photographing range of the photographing unit, when observed from the photographing unit,
wherein a focus position of the projection unit is set not shallower than the intersection between the axis going through the center of the projection range of the projection unit and the axis going through the center of the photographing range of the photographing unit, when observed from the projection unit, and
wherein a contrast value between the light portion and the dark portion in the image photographed by the photographing unit has a maximum value in an area deeper than the intersection, when observed from the photographing unit.

8. A three dimensional shape measurement apparatus comprising:
a projection unit configured to project a pattern including a light portion and a bright portion to a target object;
a photographing unit configured to photograph the target object onto which the pattern is projected;
a detection unit configured to detect an edge position representing a boundary between the light portion and the dark portion based on an image photographed by the photographing unit; and
a measurement unit configured to measure a three dimensional shape of the target object based on the edge position detected by the detection unit,
wherein a focus position of the photographing unit is set deeper than a measurement reference surface when observed from the photographing unit, such that a measurement error of the edge position determined based on a brightness of a photographed image and a contrast value of the photographed image in a first measurement surface that is a measurement surface closest to the photographing unit becomes substantially equal to a measurement error of the edge position in a second measurement surface, that is the farthest from the photographing unit, of measurement surfaces in a measurement area, that is an area within a predetermined range from the measurement reference surface including an intersection between an axis going through a center of a projection range of the projection unit and an axis going through a center of a photographing range of the photographing unit.

9. The apparatus according to claim 8, wherein the measurement reference surface is located at a position where a depth of the measurement area is bisected when observed from said photographing unit.

10. The apparatus according to claim 8, wherein the focus position of the photographing optical system is set within the measurement area.

11. The apparatus according to claim 8, wherein a focus position of the projection unit is set not shallower than the intersection between the axis going through the center of the projection range of the projection unit and the axis going through the center of the photographing range of the photographing unit, when observed from the projection unit.

12. The apparatus according to claim 8, wherein the focus position of the photographing unit is changed in accordance with a size of the measurement area.

13. The apparatus according to claim 8, wherein the larger the measurement area becomes, the deeper the focus position of the photographing unit is set.

14. A control method for a three dimensional shape measurement apparatus including a projection unit, a photographing unit, and a measurement unit, the method comprising:
   a projection step of causing the projection unit to project a pattern including a light portion and a bright portion to a target object;
   a photographing step of causing the photographing unit to photograph the target object onto which the pattern is projected;
   a detection step of detecting an edge position representing a boundary between the light portion and the dark portion based on an image photographed by the photographing unit; and
   a measurement step of causing the measurement unit to measure a three dimensional shape of the target object based on the edge position detected in the detection step,
   wherein a focus position of the photographing unit is set deeper than a measurement reference surface when observed from the photographing unit, such that a measurement error of the edge position determined based on a brightness of a photographed image and a contrast value of the photographed image in a first measurement surface that is a measurement surface closest to the photographing unit becomes substantially equal to a measurement error of the edge position in a second measurement surface, that is the farthest from the photographing unit, of measurement surfaces in a measurement area that is an area within a predetermined range from the measurement reference surface including an intersection between an axis going through a center of a projection range of the projection unit and an axis going through a center of a photographing range of the photographing unit.

15. A non-transitory computer-readable storage medium storing a computer program for causing a computer to execute each step in a control method for a three dimensional shape measurement apparatus, the method comprising:
   a projection step of causing a projection unit to project a pattern including a light portion and a bright portion to a target object;
   a photographing step of causing a photographing unit to photograph the target object onto which the pattern is projected;
   a detection step of detecting an edge position representing a boundary between the light portion and the dark portion based on an image photographed by the photographing unit; and
   a measurement step of causing a measurement unit to measure a three dimensional shape of the target object based on the edge position detected in the detection step,
   wherein a focus position of the photographing unit is set deeper than a measurement reference surface when observed from the photographing unit, such that a measurement error of the edge position determined based on a brightness of a photographed image and a contrast value of the photographed image in a first measurement surface that is a measurement surface closest to the photographing unit becomes substantially equal to a measurement error of the edge position in a second measurement surface, that is the farthest from the photographing unit, of measurement surfaces in a measurement area that is an area within a predetermined range from the measurement reference surface including an intersection between an axis going through a center of a projection range of the projection unit and an axis going through a center of a photographing range of the photographing unit.

* * * * *